Patented Dec. 4, 1951

2,577,640

UNITED STATES PATENT OFFICE 2,577,640

METHOD FOR ANALYZING HYDROCARBONS

Edward F. Wadley and James A. Anderson, Jr., Baytown, Tex., assignors, by mesne assignments, to Standard Oil Development Company, Elizabeth, N. J., a corporation of Delaware No Drawing. Application November 18, 1948, Serial No. 60,828

6 Claims. (Cl. 23—230)

The present invention is directed to a method for analyzing hydrocarbons. More particularly, the invention is directed to a method for analyzing hydrocarbons in which a combination of chemical and physical measurement is employed.

Prior to the present invention, it has been known that acidified mercuric nitrate and potassium permanganate would remove olefins, acyclic conjugated dienes, styrene and the like from hydrocarbon mixtures containing them. In fact, acidified mercuric nitrate and potassium permanganate are reagents well known for estimating quantities of unsaturated compounds in hydrocarbon mixtures thereof containing them.

It has also been known that measurements might be taken with an ultraviolet absorption spectrophotometer by passing light of varying wave lengths through samples of hydrocarbons and thus obtaning a value which is termed the absorption coefficient which represents the amount of light transmitted at a selected wave length. Difficulties are inherent in the employment of such procedures either of chemical or physical type in that other compounds are attacked by the chemical reagents or other compounds absorb a considerable amount of light at the selected wave length, thus resulting in inaccurate determinations. For example, if it were desired to analyze a hydrocarbon sample for a particular compound and the sample contained interfering hydrocarbons, then either mercuric nitrate or the potassium permanganate would give a measure only of the total hydrocarbon attacked by the reagents. Similarly, interfering compounds would transmit light at the various wave lengths selected and would result in inaccurate determinations which largely prove valueless in estimating quantities of hydrocarbons and mixtures thereof.

It is, therefore, the main object of the present invention to provide a method whereby hydrocarbons containing unsaturated compounds, such as conjugated diolefins, may be analyzed by a combination of chemical and physical treatments.

Another object of the present invention is to provide a method for obtaining a value which is indicative of the conjugated diolefin content of a hydrocarbon fraction containing diolefins.

In accordance with the present invention these objects are achieved by a combination of chemical and physical treatments whereby a gasoline containing conjugated diolefins, after blending with a saturated hydrocarbon, is divided into two portions, one portion being treated with a reagent selective for removal of conjugated diolefins and the other portion remaining untreated. Beams of light at selected wave lengths are then separately passed through the two portions to obtain values which are measurements of the absorption coefficients of the two portions. These values may then be inserted in equations whereby the diene index, which is indicative of the conjugated diolefin content of the sample, may be obtained.

The present invention, therefore, may be briefly described as involving blending a hydrocarbon fraction containing diolefins with a normally liquid, saturated hydrocarbon to form a blend in which the diolefin-containing fraction is in a minor quantity. The blend is then divided into two parts, one part being contacted with a solution of a treating reagent selective for the removal of dienes. The treating reagent is removed from contact with the sample and then the treated and untreated parts are separately placed in an ultraviolet spectrophotometer and absorption characteristics of the two portions determined by passing, separately, beams of light at wave lengths of 235 and 258 millimicrons through the samples to obtain values which are measures of the light absorption coefficients of the two samples. From these values it is possible to calculate various characteristics of the sample under test and to determine the diene index which is a measure of the conjugated diene content of the gasoline or the hydrocarbon fraction being analyzed.

It is important that the sample to be tested in accordance with the present invention be suitably blended with a normally liquid saturated hydrocarbon. This is necessary because the subsequent chemical treatment will change the composition of the resulting blend proportionately less than if the diene-containing hydrocarbon were treated without blending. It is contemplated that the normally liquid saturated hydrocarbon will be a paraffin or a cyclo-paraffin having at least 6 carbon atoms in the molecule such as hexane, heptane, octane, nonane, decane and the higher numbers of the same homologous series, cyclohexane, methyl cyclohexane, and the higher members of this series. The isomers of these series of hydrocarbons such as isoheptane, iso-octane, isononane, isodecane and the like as well as the substituted cycloparaffins may be satisfactorily employed; in fact, iso-octane is a preferred diluent.

The amount of the diluent employed in blending the diolefin containing fractions will usually be one part or volume of the diene-containing hydrogen for every 24 volumes of the normally liquid saturated hydrocarbon. However, if the composition of the diene-containing hydrocarbon is such that the dienes are a relatively major component, the proportions of the blend may be adjusted and smaller quantities of the diene-containing hydrocarbon may be used with larger quantities of the normally liquid hydrocarbon. For example, the normally liquid hydrocarbon may be used in amounts as great as 99.75 parts and the diolefin containing fraction may be employed in as little as 0.25 part. It will be preferred, however, to use one part of the fraction undergoing analysis and 24 parts of the normally liquid hydrocarbon.

The treating reagent employed in the practice of the present invention should be selected for the removal of dienes and may be a solution of nitric acid acidified mercuric nitrate or potassium permanganate. The nitric acid acidified mercuric nitrate may be made up as follows: 100 grams of mercuric nitrate and 10 milliliters of concentrated nitric acid are added to water to form a liter of aqueous solution. The potassium permanganate solution may be preferably a saturated solution although more dilute solutions may be used. It is important, however, that the solution be alkaline.

The ultraviolet spectrophotometer employed in the practice of the present invention may be any one of those known to the art. However, an ultra-violet spectrophotometer eminently suitable in the practice of the present invention has been described by Carey and Beckman in the "Journal of the Optical Society of America," vol. 31, page 682, 1941. The method described by Carey and Beckman in obtaining absorption coefficients may also be used in the practice of the present invention.

In practicing the present invention in a preferred mode, one ml. of the gasoline under test is dissolved in a non-volatile saturated hydrocarbon, such as iso-octane for example, to make up a solution of 25 ml. A portion of this solution is then diluted properly in accordance with conventional techniques for measurement of the obsorption coefficients of gasoline at 235 and 258 millimicrons in an ultra-violet spectrophotometer of the type described by Carey and Beckman. Another portion of the sample is then treated with nitric acid acidified mercuric nitrate or potassium permanganate to remove interfering compounds. When the nitric acid acidified mercuric nitrate is employed, the yellow precipitate representing the reaction product with the unsaturated compounds is removed by filtration from the hydrocarbon phase after separation of the aqueous phase and the filtrate from this operation is then diluted for measurement of the absorption coefficient of the treated gasoline. The filtrate is then analyzed in an ultra-violet spectrophotometer of the aforesaid type and the absorption coefficient $K$ determined at wave lengths of 235 and 258 millimicrons. These values are then employed to obtain the delta absorption coefficient $K$ by subtracting the absorption coefficient $K_{235}$ after treatment with the treating reagent from the absorption coefficient $K_{235}$ before treatment. The delta absorption coefficient $K_{258}$ is obtained in a similar manner. The equations for calculating the delta absorption coefficients of the two wave lengths are as follows:

$$\text{delta } K_{235} = K_{235} - k_{235}$$
$$\text{delta } K_{258} = K_{258} - k_{258}$$

From the delta absorption coefficient $K_{235}$ and the delta absorption $K_{258}$ it is possible to obtain a value which may be known as the diene index which is a measure of the diolefin content of the gasoline as shown in the following equation:

$$\text{Diene index} = \text{delta } K_{235} - 1.3 \text{ delta } K_{258}$$

The value 1.3 is the ratio between the light absorption of styrene at a wave length of 235 millimicrons and the absorption of styrene at a wave length of 258 millimicrons. The product of the delta absorption coefficient $K_{258}$ times 1.3 is thereby the calculated delta $K_{235}$ for styrene. It is important that the equation for calculating the diene index be corrected for styrene and its homologues when the diene-containing fraction contains styrene and the higher members of the same homologous series. Styrene and its homologues absorb light at wave lengths of 235 and 258 millimicrons. Therefore, in accordance with the present invention, when such fractions are present, it is necessary to make the correction given above for the absorption of styrene and its homologues at these two wave lengths. The equation for calculating the diene index given above may, therefore, be expressed as follows:

$$\text{Diene index} = \text{delta } K_{235} - F \text{ delta } K_{258}$$

where $F = 1.3$ when the diene-containing fraction comprises styrene and/or its homologues.

The diene index obtained in the aforesaid manner is a reliable measure of the diolefin content of the hydrocarbon fraction and also may be employed as a measure of predicting the performance of a gasoline.

It has been known for some time in the industry that the presence of varnish and gum deposits in the automotive motor is not due solely to the oxidation of lubricating oil fractions, but is due in large part to the presence of deleterious compounds in the gasoline. The performance of gasolines in automotive engines has been predicted by a so-called FL-2 rating. The FL-2 rating is a measure of the tendency of the gasoline to form deposits in the engine, and a description of the method of test is available from Coordinating Research Council Incorporated, 30 Rockefeller Plaza, New York, New York, in their "Test Procedures for Determining Engine Deposits formed during Low Temperature Operations" (CRC designations FL-2), October 10, 1945. This procedure was modified as shown in the following table:

*Low temperature Chevrolet engine test*
*(Full scale, 216 cubic inch engine)*

CRC, FL-2 procedure:
   Standard test lubricant
   Total operating time, hours _____ 40
   Speed R. P. M. _____ 2500
   Load, B. H. P. _____ 45
   Air/fuel ratio _____ 14.5/1
   Crankcase ventilating air, CFH ____ 60

Water jacket temperature, °F.:
   Inlet _____ 85
   Outlet _____ 95
   Crankcase oil temperature, °F. _____ 165
   Inlet air temperature, °F. _____ 110

The various engine tests presented are expressed as a percentage of the demerit ratings obtained on an arbitrary reference fuel which has been tested periodically in each engine, thus placing all results on a comparable basis. For this reason, in comparing a series of fuels, those with higher ratings in terms of per cent reference have poorer quality than those of low ratings, since the high values mean that more deposits were formed.

The greatest utility of this invention has been in the use of the correlation of acyclic conjugated diene content with engine deposit characteristics of gasolines. Not only is it possible to predict the deposit characteristics of a finished gasoline, but in addition, it is possible to predict the effect of blending into the gasoline components of different quality. Thus, when blending a gasoline to finished octane specifications, it is customary to use virgin naphthas, aromatic concentrates, catalytic naphthas, pentanes, butanes, and other components. With a knowledge of the deposit characteristics of each of these stocks, which in the case of thermal and catalytically cracked stocks may vary from time to time with variations in operating conditions under which they are produced, a final blend of gasolines may be prepared which meets not only the octane specifications and other product quality specifications for the gasolines but also meets specifications with regard to engine deposit characteristics.

Not only is the correlation useful for predicting the quality of gasolines and gasoline components but the correlation is also very valuable and extremely useful in controlling or adjusting plant operations. For example, it is possible to control the degree of hydrogenation of a cracked fraction containing dienes by measuring the diene content of the fraction being hydrogenated. It is known that the mono-olefins perform well in automotive engines and do not deposit gum and varnish in the critical parts of the motor; on the other hand, the diolefins are bad actors. Therefore, one way of controlling such a reaction is to vary the conditions on hydrogenation in accordance with the diene index of the hydrogenated gasoline. Thus, if the diene index is relatively high, it will be known that the conditions are improper to remove the diolefins. Whereas, if the diene index is relatively low, it may be concluded that the diolefins are being substantially removed. Caution must be exercised in this respect since severe hydrogenation would also remove the mono-olefins and a compromise must be made by selectively hydrogenating only the diolefins.

While the present invention has greatest utility in the analysis of gasoline, it is not intended to restrict its use to gasoline components. It may be applied to higher boiling fractions such as kerosene and gas oil boiling up to about 650° F. It should be borne in mind, however, when applying the invention to fractions boiling above about 400° F., that it may be necessary to employ another value for F in the equation for calculating the Diene Index. Thus, lower values approaching 1.0, in the neighborhood of 1.1, may be substituted for the higher value 1.3 when the higher boiling components are analyzed. The term "higher boiling components" as used herein means those hydrocarbon fractions boiling in the kerosene and gas-oil boiling range having an initial boiling point of not less than 400° F. and a final boiling point no greater than about 650° F.

The diene index has been described in part in copending application U. S. Ser. No. 37,527, filed July 8, 1948, for Edward F. Wadley and Rufus B. Bennett. This aforesaid application is directed to a method for improving the quality of gasolines whereby the gasolines are treated with hydrogen under carefully controlled conditions.

The nature and objects of the present invention having been completely described and illustrated, what I wish to claim as new and useful and to secure by Letters Patent is:

1. A method for analyzing a hydrocarbon fraction selected from the group of fractions boiling in the gasoline boiling range and in the kerosene and gas-oil boiling range and containing dienes which comprises blending said fraction with a normally liquid saturated hydrocarbon to form a blend in which said diene-containing fraction is in a minor quantity, dividing said blend into first and second portions, contacting said first portion with a solution of a treating reagent, selective for the removal of dienes, selected from the group consisting of nitric acid acidified mercuric nitrate and potassium permanganate, removing said treating reagent from contact with said contacted portion, and passing separately separate beams of light at wave lengths of 235 and 258 millimicrons through at least a portion of said contacted first portion and through at least a portion of said second portion to obtain values which are measures of the light absorption coefficients of said contacted first portion and said second portion at said wave lengths whereby the diene index of said fraction may be obtained.

2. A method in accordance with claim 1 in which the normally liquid saturated hydrocarbon has at least six carbon atoms in the molecule.

3. A method in accordance with claim 1 in which the hydrocarbon fraction containing dienes is blended with the normally liquid saturated hydrocarbon in the ratio of one part of diene-containing fraction to twenty-four parts of normally liquid hydrocarbon.

4. A method in accordance with claim 1 in which the hydrocarbon fraction containing dienes boils in the gasoline boiling range and the normally liquid hydrocarbon is iso-octane.

5. A method for analyzing a hydrocarbon fraction boiling in the gasoline boiling range containing styrene and its homologues which comprises blending said fraction with iso-octane to form a blend in which said diene-containing fraction is in a minor quantity; dividing said blend into first and second portions, contacting said first portion with a solution of a treating reagent, selective for the removal of dienes, selected from the group consisting of nitric acid acidified mercuric nitrate and potassium permanganate, removing said treating reagent and reaction products thereof from contact with said treating reagent and passing separately separate beams of light at wave lengths of 235 and 258 millimicrons through at least a portion of said contacted first portion and through at least a portion of said second portion to obtain values which are measures of the light absorption coefficients of said contacted first portion and said second portion at said wave lengths whereby the diene index of said fraction may be obtained.

6. A method in accordance with claim 5 in which the hydrocarbon fraction containing dienes is blended with iso-octane in the ratio of one part of diene-containing fraction to twenty-four parts of iso-octane.

EDWARD F. WADLEY.
JAMES A. ANDERSON, JR.

No references cited.